United States Patent [19]

Bhattacharyya et al.

[11] 4,166,003
[45] Aug. 28, 1979

[54] NUCLEAR CORE AND A REFLECTOR ASSEMBLY THEREFOR

[75] Inventors: Ajay Bhattacharyya, Vesteras, Sweden; Ernst H. G. Weiss, Murrysville, Pa.

[73] Assignee: Westinghouse Electric Corp., Pittsburgh, Pa.

[21] Appl. No.: 613,728

[22] Filed: Sep. 15, 1975

Related U.S. Application Data

[63] Continuation of Ser. No. 346,548, Mar. 30, 1973, now Defensive Publication No. T927,001.

[51] Int. Cl.² .................................................. G21C 15/10
[52] U.S. Cl. ........................................ 176/61; 176/40; 176/50; 176/83; 176/18
[58] Field of Search ....................... 176/50, 61, 84, 40, 176/17, 18, 83

[56] References Cited

U.S. PATENT DOCUMENTS

| 2,857,324 | 10/1958 | De Boisblanc et al. | 176/61 |
| 3,318,777 | 5/1967 | Keruenoael et al. | 176/61 |
| 3,549,493 | 12/1970 | Germer | 176/61 |

Primary Examiner—Harvey E. Behrend
Attorney, Agent, or Firm—D. C. Abeles; Z. L. Dermer

[57] ABSTRACT

A nuclear core including a reflector assembly cooling arrangement utilizing a combination of forced and natural convection cooling. Forced convection cooling is achieved by using a low pressure gradient to drive coolant through the reflector assembly. Natural convection cooling of the reflector assembly is accomplished by using heat from the reflector assembly and cooling provided by core bypass coolant flow to circulate coolant by natural means through the reflector assembly.

16 Claims, 3 Drawing Figures

NUCLEAR CORE AND A REFLECTOR ASSEMBLY THEREFOR

This is a continuation of application Ser. No. 346,548 filed Mar. 30, 1973, now defensive Publication No. T927,001 published Oct. 1, 1974.

BACKGROUND OF THE INVENTION

1. Field of the Invention

This invention relates generally to a nuclear reactor core and more particularly, to a cooling arrangement for a reflector assembly of a core of a liquid metal-cooled fast breeder nuclear reactor.

2. Description of the Prior Art

A nuclear core of a liquid metal-cooled fast breeder reactor comprises a plurality of fuel assemblies, radial blanket assemblies (breeder assemblies), reflector assemblies and control rod assemblies. The fuel assemblies contain nuclear fuel which undergoes nuclear fission thereby producing heat which is eventually converted into commercial electrical energy. The radial blanket assemblies contain a fertile material which on capture of an excess neutron produced by the fission process, is converted into a fissile material which may then be used in another core of another reactor. The reflector assemblies serve as shielding and improve the nuclear performance of the core including the radial blanket assemblies by reflecting neutrons produced by the fission process back into the nuclear core. These neutrons would otherwise escape from the core and be wasted. Control or adjustment of the power output by the reactor and shutdown of the reactor is accomplished by control rod assemblies which function to poison the nuclear reaction by absorption of neutrons.

In the type of nuclear reactor considered herein, the heat produced by the fission process is removed by flowing a reactor coolant, such as liquid sodium, through the nuclear core. This coolant flow also removes heat from the core which is generated by neutron absorption and gamma heating within for example, the reflector assemblies. The reactor coolant flow is internal to all the assemblies contained within the nuclear core. The coolant flow is kept within the individual assemblies by flow barriers or "cans" comprising hexagonal containers which enclose each assembly of the core. This type of arrangement permits individual tailoring or adjusting of the coolant flow through the various assemblies in accordance with the particular cooling requirements of these individual assemblies. For example, the amount of heat generated in all of the reflector assemblies is less than one percent of the total reactor power; therefore, as compared to the fuel assemblies, a much lesser coolant flow rate is required to cool the reflector assemblies. Nuclear cores using the aforementioned reactor coolant flow arrangement are generally designated as closed cores. By way of contrast, most pressurized water reactors use an open core arrangement which allows reactor coolant to flow indiscriminantly both through and between the various core assemblies.

A number of distinct advantages are gained from the use of a closed core in a nuclear reactor. This is especially so for a liquid metal-cooled fast breeder reactor. First, a significant improvement in reactor performance is realized because of the elimination or minimization of reactor coolant flow which bypasses the nuclear core. Second, it enhances the structural integrity of the nuclear core by reducing the probability of failure propagation between fuel assemblies. However, some disadvantages also result from a closed core cooling arrangement. One major disadvantage is inherent design deficiencies of the orifices which are required to reduce the rate of coolant flow through reflector assemblies as compared to the coolant flow rate through the fuel assemblies. The prior art solution was to design orifice plates to fit within the individual assemblies which result in very high pressure drops to achieve very low flow rates through the assemblies. Since the velocity of the coolant flow through such orifice plates is very high, flow cavitation is possible and the orifices are subjected to wear by erosion. The erosion makes it extremely difficult to assure adequate performance of such orifice plates over the long residence time of the reflector assemblies in the nuclear core. Further, since the performance of orifices deteriorates rapidly with off design conditions, operation of the nuclear reactor at low power levels and low flow rates causes severe maldistribution of the flow through the reflector assemblies which in turn, results in ineffective cooling of the reflector assemblies.

SUMMARY OF THE INVENTION

In one embodiment of this invention, a perforated plate placed across the reactor coolant inlet end of the core is used to create a small pressure drop to drive a relatively small quantity of reactor coolant through the reflector assemblies. Coolant flow inlet and outlet ports of the reflector assemblies are connected to the high and low pressure side of the perforated plate, respectively. Coolant flow passageways within the reflector assemblies duct the coolant from the inlet ports up through the center of the assemblies to a closed plenum chamber located in the uppermost portion of the reflector assembly. The coolant then flows down the periphery of the reflector assembly through axial flow channels provided immediately interior of a hexagonal container enclosing the reflector assembly. Upon exiting from the outlet ports of the reflector assemblies, the reflector coolant mixes with the main stream of reactor coolant prior to entering the remainder of the assemblies comprising the nuclear core.

The aforementioned coolant flow path in conjunction with the consequent heating of the reflector coolant by heat transfer from the reflector assemblies and cooling of the reflector coolant by heat transfer to the core bypass coolant flow, provides for natural circulation of the coolant through the reflector assemblies. This effect is extremely important during low power-low flow operation of the nuclear reactor during which time the pressure gradient across the perforated plate or across any orifice, may be insufficient to drive a sufficient amount of coolant through the reflector assemblies.

In the manner described, this invention provides a core including a reflector assembly cooling arrangement utilizing a combination of forced and natural convection cooling. Furthermore, the forced convection cooling is accomplished without the use of high pressure drop-high velocity orifices. Thus, the prior art problems attendant with the use of such orifices, such as erosion and cavitation, are eliminated.

BRIEF DESCRIPTION OF THE DRAWINGS

Other advantages of the invention will be apparent from the following detailed description taken in consideration with the accompanying drawings, in which.

DESCRIPTION OF THE PREFERRED EMBODIMENTS

Figure 1:
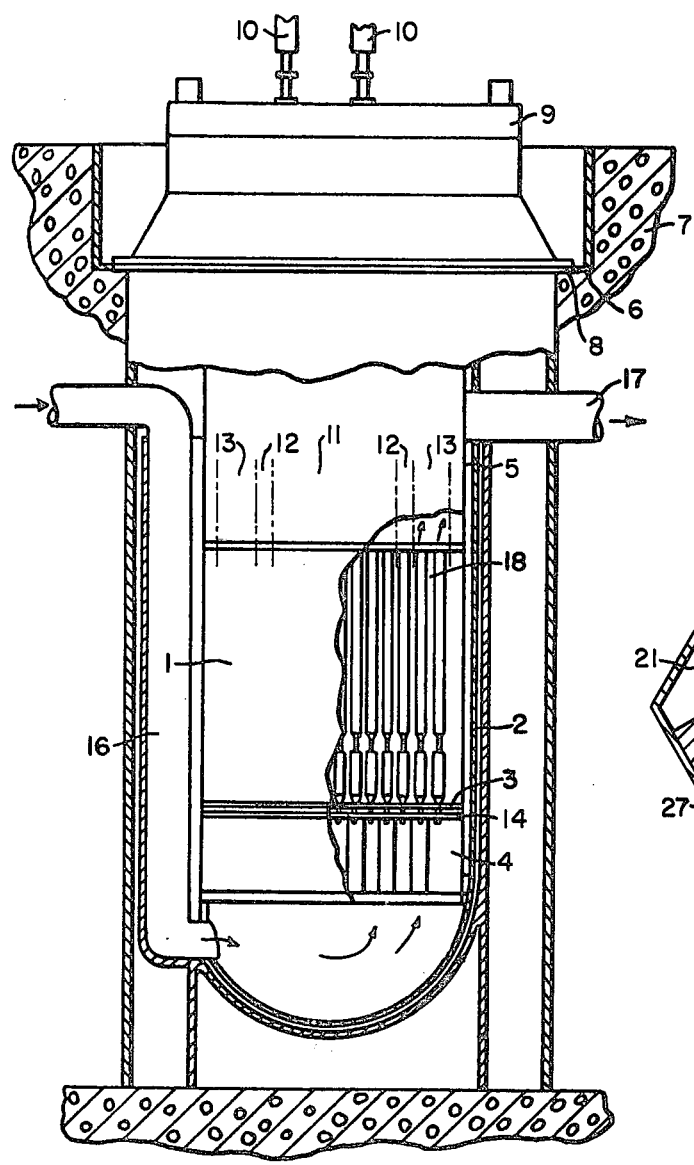
FIG. 1 is a vertical cross-sectional view of one form of a nuclear reactor having a core in accordance with this invention.

Throughout the description which follows, like reference characters indicate like elements in the various figures of the drawings.

Referring now more particularly to FIG. 1 of the drawings, the nuclear reactor illustrated therein is a liquid metal-cooled fast breeder nuclear reactor. A nuclear core 1 which is contained within a reactor vessel 2, is axially supported by a lower core plate 3 which forms part of a lower core support structure 4. The load from the lower core support structure 4 is transferred to a core barrel 5 and ultimately to a support ledge 6 in a reactor vessel vault 7 by a reactor vessel flange 8.

The upper portion of the reactor vessel 2 is hermetically sealed by a removable closure head 9 upon which are mounted a plurality of control rod drive mechanisms 10. FIG. 1 only shows two such rod drive mechanisms 10 for purposes of simplicity. Each rod drive mechanism 10 is connected to a control assembly (not shown) which penetrates the reactor vessel 2 and extends into the nuclear core 1. The primary functions of the control rods are to increase or decrease the output power of the nuclear reactor and to shut down the nuclear reactor.

In the type of nuclear reactor shown, the nuclear core 1 is comprised of a center region of fuel assemblies 11, a radial blanket of breeder assemblies 12 and an outer row of reflector assemblies 13. Control rod assemblies (not shown) are dispersed throughout the fuel assemblies 11 within the center region of the nuclear core 1. The fuel assemblies 11 contain fissile material, such as plutonium $-239$, which undergoes nuclear fission thereby producing heat. This heat is eventually converted into electrical energy. The breeder assemblies 12 contain a fertile material, such as depleted uranium $-238$, which on capture of excess neutron produced by the fission process is converted of fissile plutonium $-239$. Stainless steel or nickel are two of the more common materials which may be used in the reflection assemblies 13. By reflecting neutrons which would otherwise be wasted, the reflector assemblies 13 improve the nuclear performance of the core and increase the breeding ratio. The breeding ratio is usually defined as the amount of new nuclear fuel generated divided by the amount of nuclear fuel consumed by the nuclear reactor. Since the reflection of neutrons necessarily means that these neutrons do not reach the reactor vessel 2 wall, the reflector assemblies 13 protect the reactor vessel 2 wall from possible damage by neutron radiation.

The heat produced by fission of the nuclear fuel is removed by flowing a reactor coolant, for example liquid sodium, through the nuclear core 1. The core coolant flow is restricted, within practical limits, to the interior of the individual assemblies comprising the nuclear core 1. Coolant flow exterior of the various core assemblies is known as core bypass flow. This latter flow is highly undesirable in that it reduces the overall efficiency of the nuclear reactor. The rate of coolant flow through the fuel assemblies 11 and hence, the pressure drop across the nuclear core 1, largely determines the flow conditions for all other core assemblies. That is, the pressure drop across the fuel assemblies 11 is the same as the pressure drop across the breeder assemblies and the control rod assemblies (not shown). But, the amount of heat to be removed and thus, the required rate of coolant flow through the breeder assemblies 13 and the control rod assemblies (not shown) is much less than that of the fuel assemblies 11. In order to accomplish this required flow adjustment, these assemblies are internally orificed consistent with prior art teachings. The coolant flow rate through the reflector assemblies 13 however, is adjusted in a unique fashion as provided by the present invention.

The amount of heat generated in the reflector assemblies 13 is a small fraction, approximately one percent, of the total reactor power. To prevent overheating, it is necessary to cool, but not overcool, the reflector assemblies 13. Overcooling the reflector assemblies 13 wastes reactor coolant, reactor pumping power, and induces severe thermal strains within the assemblies.

Figure 2:
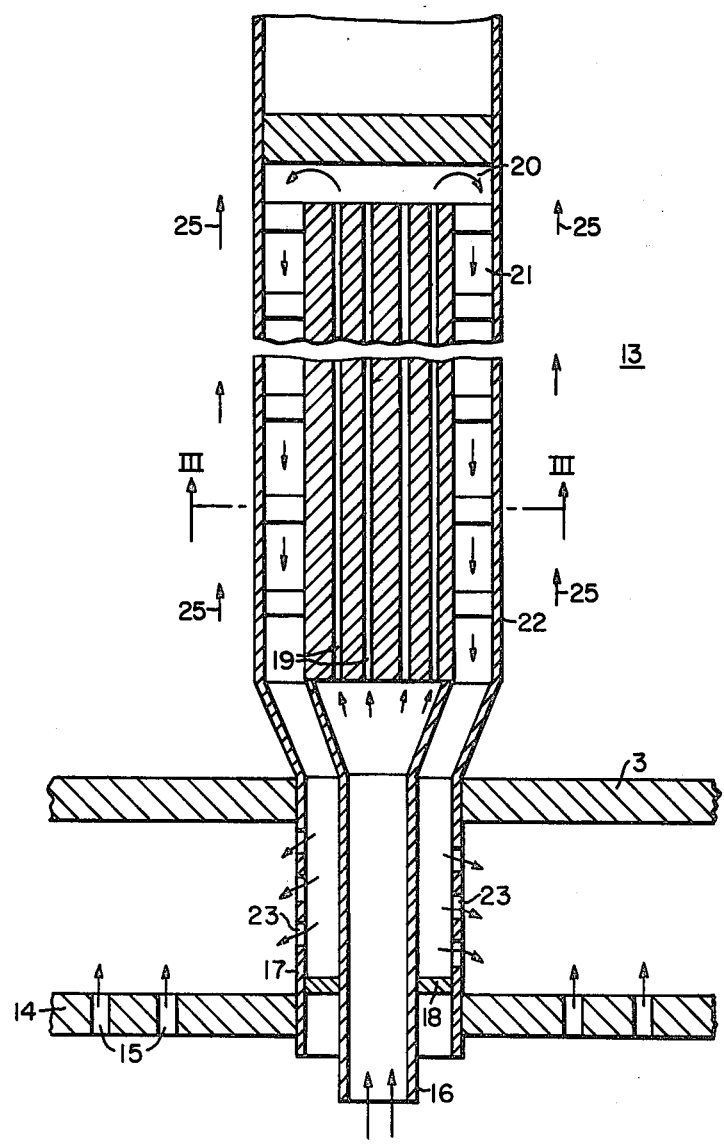
FIG. 2 is an enlarged fore-shortened sectional view of a reflector assembly with a cooling arrangement as provided by this invention.

The cooling arrangement for the reflector assemblies 13 of the core as provided by this invention is shown in FIG. 2 of the drawings. A perforated plate 14 placed across the lower or inlet end of the nuclear core 1 creates a pressure drop to force reactor coolant through the reflector assemblies 13 during normal operation of the reactor. The pressure drop is created by flowing the reactor coolant, which later flows through the entire core, through specially designed orifice holes 15 in the perforated plate 14. Therefore, the reactor coolant flows through the perforated plate at a low velocity which insures trouble-free operation. A coolant inlet 16 to the reflector assemblies 13 is located on the high pressure side of the perforated plate 14, while a coolant outlet 17 is located on the low pressure side of the perforated plate 14. In the embodiment shown, the coolant inlet 16 and the coolant outlet 17 comprise generally cylindrical concentric ducts which are separated by a suitable seal or baffle 18. The reflector coolant flows through the coolant inlet 16 and then up the reflector assembly 13 through suitably sized flow channels 19 in the central region of the reflector assembly 13. The reflector coolant then enters a closed plenum 20, turns 180° and flows down the periphery of the reflector assembly 13 and through flow channels 21 provided internal of a hexagonal container 22 totally enclosing the reflector assembly 13. The reflector coolant then exits the reflector assembly 13 through holes 23 provided in the coolant outlet 17 and mixes with the main stream of reactor coolant downstream of the lower core plate 24 prior to flowing up through the nuclear core 1.

Cooling of the reflector assembly 13 by forced convection in the manner heretofore described is assisted by natural convection cooling. Natural convection cooling occurs when a fluid circulates in a closed flow path without the aid of a pump or other mechanical means creating a driving pressure drop. Such flow circulation is achieved by heating subsequently followed by cooling of the fluid causing a corresponding change in the density of the fluid. When heated, the fluid density decreases causing it to rise. When cooled, the fluid density increases causing it to fall by gravity. This natural flow results in a higher heat transfer coefficient thereby resulting in convecting cooling. As applied to the present core, since the reflector coolant flow acquires heat from the reflector assembly 13, it naturally tends to rise up the length of the reflector assembly 13. Then, since the reflector coolant within the peripheral flow channels 21, between the central region of the reflector and the hexagonal enclosure 22, is cooled by the core bypass flow, indicated by the arrows designated by reference character 25, the coolant tends to fall by gravity down the length of the reflector assembly 13. In this manner, the reflector coolant flow follows a natural circulation flow path which greatly enhances the cooling effectiveness of the cooling arrangement of the reflector assembly 13. The presently provided natural convection cooling is of great significance during low flow-low power operation of the nuclear reactor during which operation insufficient forced convection cooling may exist.

Figure 3:
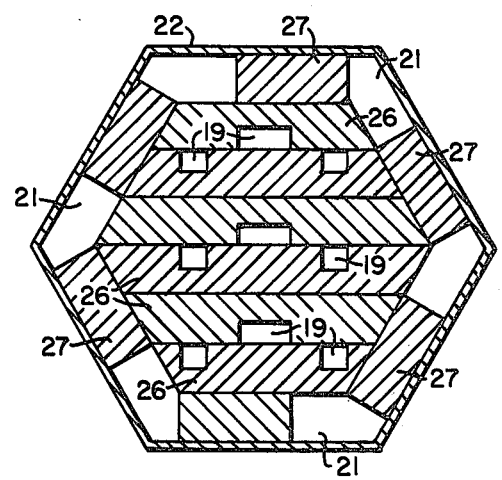
FIG. 3 is a cross-sectional view taken along the line III—III of the reflector assembly shown in FIG. 2.

A cross-sectional view of a reflector assembly 13 is shown in FIG. 3. The central region of the reflector assembly 13 comprises a stacked array of flat plates 26, fabricated from a neutron reflecting material such as stainless steel or nickel. Flow channels 19 for cooling the central region of the reflector assembly 13 are shown as slots machined into or extruded intergral with the flat plates 26. Suitable spacers 27, which also may be made from neutron reflecting material, are used to separate the central region of the reflector assembly 13 from the hexagonal closure 22 thereby creating return flow channels 21.

It is to be observed, that the details of the reflector assembly 13 shown in FIGS. 2 and 3 are somewhat simplified and intended only to be illustrative of the principles of this invention to someone skilled in the art. The size, number and location of flow channels 19 and 21 must be determined for a particular nuclear reactor consistent with overall thermal design and practical fabrication techniques. The same considerations are equally applicable to the coolant inlet and outlet ducts 16 and 17 respectively, of the reflector assembly 13.

From the foregoing description, taken in connection with the drawings, it is seen that this invention provides a core including a reflector assembly cooling arrangement for nuclear reactor. The cooling arrangement utilizes a combination of forced convection and natural convection cooling by flow a coolant, in double pass fashion, through the reflector assemblies, and then flowing the coolant through the remainder of the nuclear core. The invention further provides a pressure reducing arrangement for controlling the rate of coolant flow through the reflector assemblies whereby low velocity orifices are used which are insensitive to either erosion wear of flow cavitation.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A reflector assembly arrangement for use in a core of a nuclear reactor, said core being of a type which is cooled by flow therethrough of a liquid metal reactor coolant, said reflector assembly arrangement including;

a plurality of reflector assemblies, each of said reflector assemblies comprising an elongated, generally circular enclosure, and means for reflecting neutrons positioned within said enclosure, said enclosure being associated with said neutron reflecting means so as to form at least one longitudinal coolant flow path therebetween, said neutron reflecting means having a plurality of longitudinal flow channels therein, said flow channels being connected with said flow path forming a double pass coolant flow path within said reflector assembly, means for supplying influent coolant to each of said reflector assemblies, said means being flow connected to said flow channels in said neutron reflecting means, means for removing effluent coolant from each of said reflector assemblies, said means being flow connected to said flow path between said enclosure and said neutron reflecting means, and means for creating a pressure differential, said means located upstream of said core and interposed said means for supplying influent coolant and said means for removing effluent coolant, said means creating a pressure differential by flow therethrough of said reactor coolant, said pressure differential simultaneously being created across said means for supplying influent coolant and said means for removing effluent coolant causing double pass coolant flow through each of said reflector assemblies.

2. The reflector assembly arrangement of claim 1, wherein said means for creating a pressure differential comprises a plate member having a plurality of openings therein, said openings being sized to create a predetermined pressure differential across said plate member.

3. The reflector assembly arrangement of claim 1, wherein said flow path between said enclosure and said neutron reflecting means is associated, in heat transfer relationship, with reactor coolant flowing through said core such that coolant circulates through each of said reflector assemblies by natural means.

4. The reflector assembly arrangement of claim 1, wherein said means for supplying influent coolant comprises a generally cylindrical tube member having one end open and positioned upstream of said pressure differential creating means and having the other end connected to said neutron reflector means for ingress of coolant with said reflector assembly.

5. The reflector assembly arrangement of claim 1, wherein said neutron reflecting means comprises a plurality of elongated metal plates having said plurality of coolant flow channels formed intergrally therewith, said plates being arranged to form a generally cylindrical cross-sectional shape.

6. The neutron reflector means of claim 4, wherein said generally cylindrical cross-sectional shape comprises a hexagon.

7. The neutron reflector means of claim 5 wherein said metal comprises nickel.

8. The neutron reflector means of claim 5, wherein said metal comprises stainless steel.

9. The reflector assembly arrangement of claim 1, wherein said means for removing effluent coolant comprises a generally cylindrical tube member having one end open and positioned downstream of said pressure differential creating means, and having the other end connected to said enclosure means for egress of coolant from said reflector assembly.

10. The reflector assembly arrangement of claim 1, wherein said means for supplying influent coolant and said means for removing effluent coolant comprise concentric inner and outer tube members, said outer tube member being connected to said enclosure and open to the downstream side of said means for creating a pressure differential, said inner tube member being connected to said neutron reflecting means and open to the upstream side of said means for creating a pressure differential, and a seal member sealing the annulus formed by said inner and said outer tube members, said seal member being located adjacent said means for creating a pressure differential.

11. The reflector assembly arrangement of claim 1, wherein said elongated enclosure means comprises a tube having a generally cylindrical cross-sectional shape.

12. The enclosure means of claim 10, wherein said generally cylindrical cross-sectional shape is hexagonal.

13. The reflector assembly arrangement of claim 1, wherein said coolant flow path between said enclosure means and said neutron reflector means is formed by a plurality of space blocks positioned axially along the length of said reflector assembly.

14. A core for a nuclear reactor, said core being of a type which is vertically positioned within a sealed reactor vessel and is cooled by flow therethrough of a liquid metal reactor coolant, said core comprising a plurality of coextensive fuel assemblies arranged in parallel, a plurality of coextensive reflector assemblies arranged in parallel and positioned around the periphery of said fuel assemblies, a lower support structure means for supporting said fuel assemblies and said reflector assemblies, said lower support structure means including a pair of spaced plate members, each plate member having a plurality of openings therein with respective openings being in vertical alignment, said vertically aligned openings having the lower end of respective reflector assemblies and the lower end of respective fuel assemblies extending therethrough, the lower end of said reflector assemblies comprising a pair of concentric cylinder members with the outer of said cylinder members being closely received in said vertically aligned openings, annular seal means extending between said cylinder members adjacent the lower of said spaced plate members for sealing the annulus formed by said concentric cylinder members, said reflector assembly forming a reentrant flow path therewithin with the inlet of said flow path comprising the inner of said cylinder members, said inner cylinder member being open at the lower end to form flow communication with space below the lower of said spaced plate members, the outer of said cylinder members having a plurality of openings therein, said openings being positioned to form flow communication between the annular space between said concentric cylinder members and the space between said spaced plate members, said annular space and said openings in said outer cylinder member forming the outlet of said reentrant flow path, and orifice means formed in said lower of said spaced plate members, said orifice means being sized to create a predetermined pressure differential thereacross, with the lower pressure being between said spaced plate members, to force coolant flow along said reentrant flow path through said reflector assembly.

15. The core of claim 14, wherein each of said reflector assemblies include an elongated, generally cylindrical enclosure, and means for reflecting neutrons, said neutron reflecting means being positioned within said enclosure and associated therewith so as to form a longitudinal coolant flow path therebetween, said neutron reflecting means having at least one longitudinal flow channel therewithin, said flow path and said flow channel being flow coupled at the upper end of said reflector assembly.

16. The core of claim 15, wherein the lower end of said enclosure is connected to said outer cylinder member, and said neutron reflecting means is connected to said inner cylinder member whereby said reentrant flow path within said reflector assembly is flow coupled to said predetermined pressure differential across said lower of said spaced plate members.

* * * * *